US008095572B1

(12) United States Patent
Coghlan (10) Patent No.: US 8,095,572 B1
(45) Date of Patent: Jan. 10, 2012

(54) IDENTIFYING DATABASE CONTAINERS THAT REFERENCE SPECIFIED DATA ITEMS

(75) Inventor: David Coghlan, Twickenham (GB)

(73) Assignee: Symantec Corporation, Mountain View, CA (US)

( * ) Notice: Subject to any disclaimer, the term of this patent is extended or adjusted under 35 U.S.C. 154(b) by 212 days.

(21) Appl. No.: 12/502,709

(22) Filed: Jul. 14, 2009

(51) Int. Cl.
*G06F 17/30* (2006.01)
(52) U.S. Cl. .......................... 707/804; 707/793; 707/802
(58) Field of Classification Search .......... 707/634–686, 707/694–820
See application file for complete search history.

(56) References Cited

U.S. PATENT DOCUMENTS

| | | | | |
|---|---|---|---|---|
| 7,610,285 | B1 * | 10/2009 | Zoellner et al. | 1/1 |
| 7,725,444 | B2 * | 5/2010 | Devarakonda et al. | 707/694 |
| 7,801,894 | B1 * | 9/2010 | Bone et al. | 707/737 |
| 7,805,449 | B1 * | 9/2010 | Bone et al. | 707/751 |
| 2002/0143797 | A1 * | 10/2002 | Zhang et al. | 707/200 |
| 2006/0004868 | A1 * | 1/2006 | Claudatos et al. | 707/104.1 |
| 2007/0061359 | A1 * | 3/2007 | Kilday | 707/103 R |
| 2008/0046404 | A1 * | 2/2008 | Bone et al. | 707/2 |
| 2009/0157580 | A1 * | 6/2009 | Abnous et al. | 706/45 |

OTHER PUBLICATIONS

IBM technote "Details on mail template Discover Folders action and @Command DiscoverFolders," http://www-01.ibm.com/support/docview.wss?rs=475&uid=swg21201309, Jan. 6, 2009, 3 pages.

IBM technote, "LotusScript FolderReferences property helps determine in which folders a document is stored," http://www-01.ibm.com/support/docview.wss?rs=463&uid=swg21092899, Jan. 22, 2009, 4 pages.

Lotus discussion forum, "Notes/Domino 6 and 7 Forum," http://www-10.lotus.com/ldd/nd6forum.nsf/c21908baf7e06eb085256a39006eae9f/8b9065734138ec3485256eba005b107f?OpenDocument, Jun. 21, 2004, 3 pages.

IBM technote, comp.groupware.lotus-notes.apps, "How to determine folder where a message is," http://groups.google.com/group/comp.groupware.lotus-notes.apps/browse_thread/thread/355ed38a08943664/c7655d08d258d903%20http://www-01.ibm.com/support/docview.wss?rs=463&uid=swg21092899, Jul. 23, 2008, 2 pages.

* cited by examiner

*Primary Examiner* — Shahid Alam
*Assistant Examiner* — Evan Aspinwall
(74) *Attorney, Agent, or Firm* — Meyertons, Hood, Kivlin, Kowert & Goetzel, P.C.; Dean M. Munyon (57) ABSTRACT

Systems, methods, and computer-readable storage media are disclosed for a computer system determining database containers that include references to one or more specified data items. The computer system may determine, from a plurality of containers in a database, a candidate set of containers, where the database includes a plurality of data items that includes the one or more data items. The computer system, for each of the containers in the candidate set, queries the database to determine whether the container includes a reference to any of the specified one or more data items. The computer system uses results of the querying to determine any containers in the candidate set of containers that include such references. These results may be used, for example, to set storage retention policies.

20 Claims, 8 Drawing Sheets

```
<outline name="NotesMailOutline" alias="MailOutline" language="en">
960A —   <outlineentry label="Inbox" type="namedelementlink">
              <namedelementlink type="folder" name="($Inbox)" />
         </outlineentry>

960B —   <outlineentry label="Drafts" type="namedelementlink">
              <namedelementlink type="view" name="($Drafts)" />
         </outlineentry>

960C —   <outlineentry label="Sent" type="namedelementlink">
              <namedelementlink type="view" name="($Sent)" />
         </outlineentry>

960D —   <outlineentry label="All Documents" type="namedelementlink">
              <namedelementlink type="view" name="($All)" />
         </outlineentry>
         ...
         </outline>
```

IDENTIFYING DATABASE CONTAINERS THAT REFERENCE SPECIFIED DATA ITEMS

BACKGROUND

1. Technical Field

This disclosure relates generally to data storage systems and, more specifically, to identifying containers in a database that include references to one or more specified data items.

2. Description of the Related Art

Organizations often store large amounts of content that need to be preserved, e.g., emails, documents, web communications, etc. As a result, various backup or archiving systems may be employed to store this content for later accessibility.

Certain of such systems, including SYMANTEC'S ENTERPRISE VAULT, allow a user to specify various archiving policies for a set of backup data. For example, a user might establish a storage retention policy that specifies the length of time for storing a particular set of data. The user may also set different retention policies for different groups of data—e.g., based on the importance of the data. In one instance, an organization might want to store certain important documents for 5 years, while storing lesser important documents for shorter periods such as 6 months.

Some backup or archiving systems have the ability to set retention policies for a group of data items. For example, a user may assign a specific retention policy for a folder that includes a set of email messages. In certain database systems, multiple database containers include references to the same data items. For example, a database for an email program may include a container corresponding to a user's inbox. The inbox may reference a particular email that is also referenced by another database container (e.g., another user-created folder).

SUMMARY

In one embodiment, a method for determining database containers that include references to a first data item is disclosed. The method includes a computer system determining, from a plurality of containers in a database, a candidate set of containers, where the database includes a plurality of data items that includes the first data item. Each of the plurality of data items is stored in a respective one of a plurality of records of the database, where each of the containers in the candidate set of containers includes one or more references to data items in the plurality of data items. The database is structured such that a record within the database that includes a data item does not indicate which of the plurality of containers includes a reference to that data item. The method further includes, for each of the containers in the candidate set, the computer system querying the database to determine whether the container includes a reference to the first data item. The method further includes the computer system using results of the querying to determine any containers in the candidate set of containers that include a reference to the first data item.

In some embodiments, the method further comprises backing up the database to a backup storage system, where the backing up includes setting a storage retention policy for the first data item. The storage retention policy is based at least in part on retention information associated with one or more containers in the candidate set of containers determined to include a reference to the first data item.

In some embodiments, each of the one or more containers in the candidate set of containers determined to include a reference to the first data item has an associated storage retention period. The storage retention policy for the first data item is set to be the longest of the associated storage retention periods.

In some embodiments, determining the candidate set of containers includes querying the database to return an outline for the database, causing the outline to be converted into a text file that specifies the types of containers within the database, and parsing the text file to determine containers specified by the outline that are folders or views.

In some embodiments, determining the candidate set of containers includes determining a preliminary set of containers accessible via a graphical user interface associated with the database, and then determining the candidate set of containers by determining containers within the preliminary set that are folders or views.

In some embodiments, the candidate set of containers includes a first container that is a folder, where the folder includes references to one or more data items associated with the folder by a user of the database.

In some embodiments, the candidate set of containers includes a first container that is a view, where the view includes references to one or more data items that satisfy a predetermined set of criteria specified by program instructions associated with the database.

In some embodiments, the database corresponds to an email program, and the first container includes references to email messages sent by the email program.

In some embodiments, the querying includes, for a given container in the candidate set of containers, storing each data item referenced by the given container in a hash table, and then accessing the hash table to determine whether the given container includes a reference to the first data item.

In one embodiment, an article of manufacture is disclosed that includes a computer-readable medium having stored thereon program instructions that, if executed by a computer system, cause the computer system to perform a method. The method includes retrieving an outline for a database, where the outline includes information specifying containers within the database. Each of a plurality of the specified containers includes a reference to one or more data items within the database. The method further includes using the outline to determine a candidate set of containers. The method further includes for each container in the candidate set of containers, accessing a corresponding record in the database to determine whether that container includes a reference to a specified first data item in the database. The method further includes using the accessing to create a list of containers in the candidate set of containers that include a reference to the specified first data item.

In some embodiments, the method further includes backing up the database, where the backing up includes assigning a storage retention policy to a backed up copy of first data item. The storage retention policy for the first data item is based at least in part, on retention policy information corresponding to one or more containers specified in the created list.

In some embodiments, containers in the candidate set of containers are either folders or views.

In some embodiments, the data items within the database include email messages for an email program. The database does not include an application programming interface (API) that permits a user to specify a particular data item within the database and obtain a list of any containers in the database that include a reference to the particular data item.

In some embodiments, containers in the candidate set of containers are created by a user via a graphical user interface associated with the database.

In some embodiments, the method further comprises storing up a copy of the first data item, where the storing includes assigning a storage policy to the copy of first data item, where the storage policy is based, at least in part, on storage policy information corresponding to one or more containers specified in the created list.

In one embodiment, a computer system is disclosed that includes one or more processors and a memory. The memory has stored therein program instructions executable by the computer system to determine a candidate set of containers within a database, where each container in the candidate set of containers includes a reference to one or more data items in the database. Each container within the candidate set of containers is user-accessible via a graphical user interface for the database. The program instructions are further executable to determine one or more of the candidate set of containers that include a reference to a specified first data item within the database. The program instructions are further executable to backup the database to a backup storage system, including setting a retention policy for the first data item that is based on retention information associated within one or more containers within the candidate set of containers that include a reference to the specified first data item.

In some embodiments, the program instructions are executable by the computer system to determine the candidate set of containers are executable to parse a text file returned by the database to determine containers within the database that are folders or views.

In some embodiments, the retention policy for the first data item is set to the longest retention policy associated with any of the one or more containers within the candidate set of containers that include a reference to the specified first data item.

In some embodiments, the program instructions are executable by the computer system to determine the one or more of the candidate set of containers that include a reference to a specified first data item are executable, for a given container in the candidate set of containers, to store an indication of each of the data items referenced by the given container in a hash table and then to access the hash table to determine whether the given container includes a reference to the first data item.

In some embodiments, the first data item is an email message, and the database is structured such that a record in the database that includes the first data item does not specify any containers within the database that include a reference to the first data item.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Computer System." This term has its ordinary and accepted meaning in the art, and includes one or more computing devices operating together and any software stored thereon. A computing device includes one or more processor units and a memory subsystem. A memory subsystem may store program instructions executable by the one or more processor units.

"Client system." This term has its ordinary and accepted meaning in the art, which includes a computer system that requests services, data, etc. from a server system.

"Database." This term has its ordinary and accepted meaning in the art, which includes a collection of records or data stored on a computer system.

"Container." This term refers broadly to a structure (e.g., a record or entry in a database) that includes references to a collection of data items. As described herein, a "container" may be a folder or a view.

"Folder." As used herein, this term refers to a container that includes references to data items, where the association between the container and the data items therein is manually specified by a user (e.g., of a database that includes the container). For example, a user may specify an association between a data item and a particular container by moving or copying an item into the container.

"View." This term refers to a container that includes references to data items that satisfy a predetermined set of selection criteria. In the context of an email program, a "Sent Items" container would be an example of a view, as inclusion in this container is based on predetermined criteria specified by the email program (i.e., place an item in the "Sent Items" container if the item is sent by the email program). Another example of a view would be a container that includes data items that have been placed into the container as the result of a rule specified by a user (e.g., move data items with a specific text string into a particular container), etc.

"Reference." This term refers to information within a container that is indicative of some data item, e.g., a data item in a record within a database that includes the container to a particular item. In one embodiment, a reference may be a link or pointer. A container may include references for multiple data items, where each reference points to a location of a respective data item in a database.

"Record." This term refers to a data entry within a database. Records, for example, may store information related to specific data items (e.g., an email), containers (e.g., a folder), etc.

"Outline." This term refers broadly to information specifying various containers within an information store such as a database.

"Retention policy." This term refers broadly to a type of backup, archiving, or storage policy that indicates how data should be stored (e.g., a length of time that data should be retained in a backup system).

Figure 1:
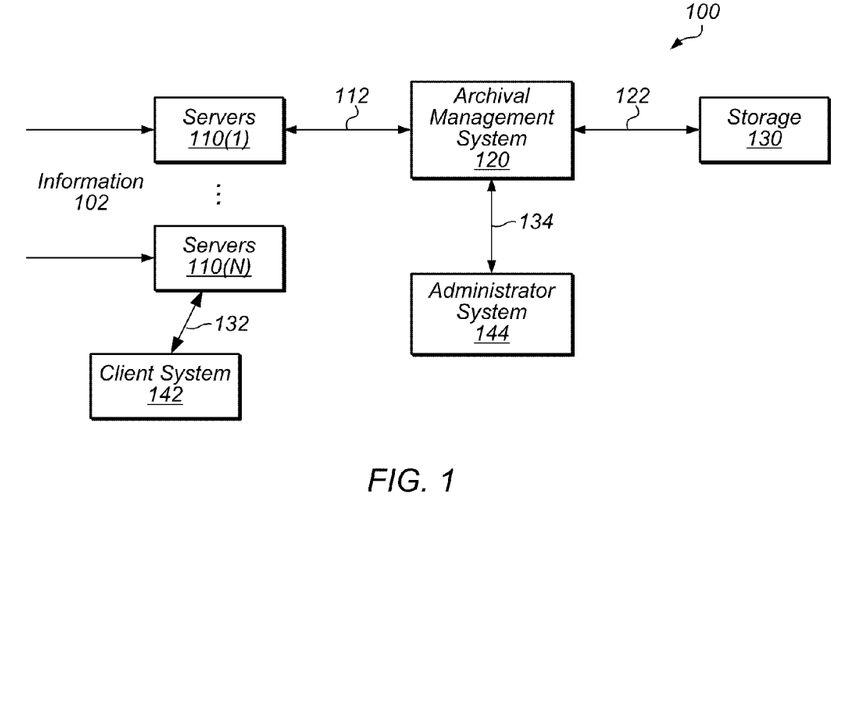
FIG. 1 is a block diagram illustrating one embodiment of a backup system.

Turning now to FIG. 1, one embodiment of a system 100 for backing up, storing, and/or archiving information is depicted. (As used herein, the terms "archive" and "backup" are used interchangeably, although the terms have slightly different connotations.) The present disclosure describes various embodiments of an archival management system (or backup management system) that is included within such a system. As will be described below, embodiments of the archival management system may be used to determine database containers that include references to one or more specified data items. In various embodiments, an archival management system may use this information to set archival policies for a given data item that is referenced by multiple containers. For example, when different archiving policies are used for different containers and these containers include a common data item, the archiving policies applied to the common data item may be in conflict. Embodiments of the archival management system described below may identify database containers that include references to a given data item and then take one or more actions based on this information—for example, setting a storage retention policy for a copy of the given data item that is based on the different policies of the various database containers that include the given data item. As described below, such techniques are particularly advantageous in situations in which the given item itself does not include information specifying any containers that include a reference to the given data item.

As shown in FIG. 1, system 100 includes servers 110(1)-(N), archival management system (AMS) 120, and storage 130. Servers 110 are coupled to AMS 120 via interconnect 112. AMS 120 is coupled to storage 130 via interconnect 122. In one embodiment, a client system 142 is coupled to one of the servers 110 via an interconnect 132. In some embodiments, an administrator system 144 may be coupled to AMS 120 via an interconnect 134. In one embodiment, AMS 120 is a separate system from servers 110. In other embodiments, AMS 120 may be located within one of servers 110. In some embodiments, storage 130 may also be located within AMS 120.

In one embodiment, servers 110 are computer systems that provide various services to one or more client systems (e.g., client system 142). For example, servers 110 may receive information 102 from external sources that is associated with email, web content, or other types of data. In some embodiments, servers 110 store information 102 in one or more databases. In various embodiments, servers 110 may implement various systems such as an email server system, a document storage system, a web hosting system, etc. Servers 110 are described in more detail below in conjunction with FIG. 2.

In one embodiment, AMS 120 is a system that is configured to backup, archive, and/or store information that is located on servers 110. For example, AMS 120 may retrieve information stored in the databases of servers 110 and provide this information to storage 130. AMS 120 may also be configured to retrieve information from storage 130 and provide it to requesting servers 110, client system 142, and/or administrator system 144. In some embodiments, AMS 120 may be implemented using a single computer system such as described in FIG. 3. In other embodiments, AMS 120 may be implemented using a cloud-computing environment, consisting of multiple servers functioning in parallel. As will be described below, AMS 120, in one embodiment, is configured to determine database containers that include references to a specified data item.

In one embodiment, administrator system 144 is a computer system that is configured to interface with AMS 120. Administrator system 144 may allow a user to manage storage operations performed by AMS 120. For example, a user of administrator system 144 may instruct AMS 120 to backup particular data items stored on servers 110. In one embodiment, a user may further instruct AMS 120 to set various storage policies for specific containers or data items. Administrator system 144 may also serve as an interface for accessing content stored in storage 130. An embodiment of administrator system 144 is described below in conjunction with FIG. 4.

In one embodiment, client system 142 is a computer system that interacts with one or more servers 110. For example, client system 142 may utilize various services provided by servers 110 such as email services, file storage services, web hosting services, etc. As a result, client system 142 may also execute various applications that interact with software executing on servers 110. For example, in one embodiment described below, client system 142 executes an email client such as the LOTUS NOTES client from IBM. In some embodiments, client system 142 may also implement any of the various features supported by administrator system 144. An embodiment of a system for implementing client system 142 is described below in conjunction with FIG. 4.

In one embodiment, storage 130 is a system (e.g., backup system, archival system) that stores information collected from servers 110. For example, storage 130 may include emails, documents, web content, or other important information. Storage 130 may also store information related to the structure of the databases within servers 110. For example, data items may be organized into a hierarchy of containers within a database on server 110. Storage 130 may include information that identifies the containers and the particular data items that are referenced by the containers. Storage 130 may employ any of a variety of storage systems and techniques. In one embodiment, storage 130 is implemented using one or more storages devices. In some embodiments, storage 130 may be implemented using multiple storage servers. One embodiment of a storage system for implementing storage 130 is described in greater detail below in conjunction with FIG. 5.

Figure 2:
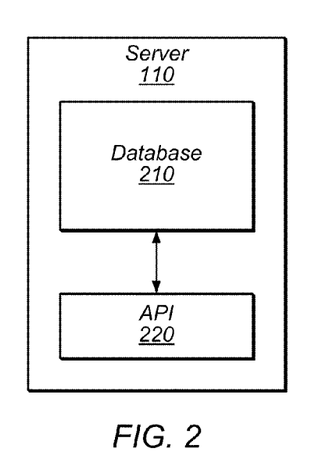
FIG. 2 is a block diagram illustrating one embodiment of a server system.

Turning now to FIG. 2, one embodiment of a server 110 is depicted. As shown, server 110 includes a database 210 and an application programming interface (API) block 220. In one embodiment, database 210 stores records associated with containers and data items. This information may include any of a variety of content collected by servers 110. API block 220 may include various APIs for interacting with database 210. For example, in various embodiments, various APIs may enable a user (e.g., at a server 110, client system 142, AMS 120, or administrator system 144) to access content stored in database 210, collect information about database 210, etc.

In one embodiment, API block 220 includes an API that generates an outline of database 210. In one embodiment, an outline is a list of containers that are stored within database 210. The outline may also include information that identifies various properties of each container. For example, in some embodiments, an outline may list the names of each container within database 210 (e.g., the container "inbox") and also indicate the type of each container such as a folder or a view. Database 210 is described in more detail below in conjunction with FIG. 6.

In one embodiment, API block 220 does not include an application programming interface (API) that permits a user to specify a particular data item within the database and obtain a list of any containers in the database that include a reference to the particular data item. As described below in conjunction with FIG. 7, embodiments of AMS 120, however, may permit such features even in the absence of an API of database 210 that has such functionality.

Figure 3:
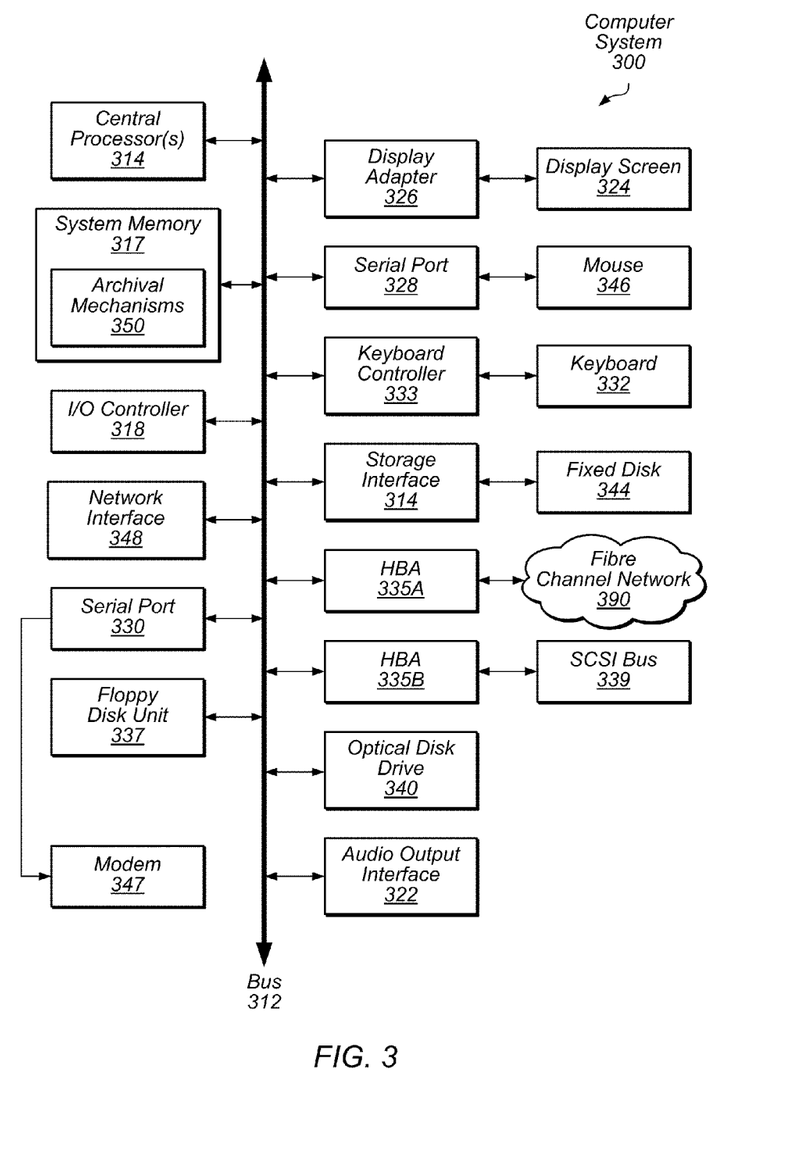
FIG. 3 is a block diagram illustrating one embodiment of a representative computer system implementing an archival or backup management system.

Turning now to FIG. 3, a block diagram of one embodiment of a computer system 300 used to implement AMS 120 is depicted. Computer system 300 includes a bus 312 which interconnects major subsystems of computer system 300, such as a central processor 314, a system memory 317 (typically RAM, but which may also include ROM, flash RAM, or the like), an input/output controller 318, an external audio device, such as a speaker system 320 via an audio output interface 322, an external device, such as a display screen 324 via display adapter 326, serial ports 328 and 330, a keyboard 332 (interfaced with a keyboard controller 333), a storage interface 334, a floppy disk drive 337 operative to receive a floppy disk, a host bus adapter (HBA) interface card 335A operative to connect with a Fibre Channel network 390, a host bus adapter (HBA) interface card 335B operative to connect to a SCSI bus 339, and an optical disk drive 340 operative to receive an optical disk. Also included are a mouse 346 (or other point-and-click device, coupled to bus 312 via serial port 328), a modem 347 (coupled to bus 312 via serial port 330), and a network interface 348 (coupled directly to bus 312).

Bus 312 allows data communication between central processor 314 and system memory 317, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 300 are generally stored on and accessed via a computer readable medium, such as a hard disk drive (e.g., fixed disk 344), an optical drive (e.g., optical drive 340), a floppy disk unit 337, or other storage medium. Additionally, applications can be in the form of electronic signals modulated in accordance with the application and data communication technology when accessed via network modem 347 or interface 348. System memory 317 may comprise program instructions (such as archival mechanisms 350) to implement various techniques described below.

Storage interface 314, as with the other storage interfaces of computer system 300, can connect to a standard computer readable medium for storage and/or retrieval of information, such as a fixed disk drive 344. Fixed disk drive 344 may be a part of computer system 300 or may be separate and accessed through other interface systems. Modem 347 may provide a direct connection to a remote server via a telephone link or to the Internet via an internet service provider (ISP). Network interface 348 may provide a direct connection to a remote server via a direct network link to the Internet via a POP (point of presence). Network interface 348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 3 need not be present to practice the present disclosure. The devices and subsystems can be interconnected in different ways from that shown in FIG. 3. The operation of a computer system such as that shown in FIG. 3 is readily known in the art and is not discussed in detail in this application. Code to implement the present disclosure can be stored in computer-readable storage media such as one or more of system memory 317, fixed disk 344, optical disk, or floppy disk. The operating system provided on computer system 300 may be MS-DOS®, MS-WINDOWS®, OS/2®, UNIX®, Linux®, or another known or suitable operating system.

Moreover, regarding any signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 4:
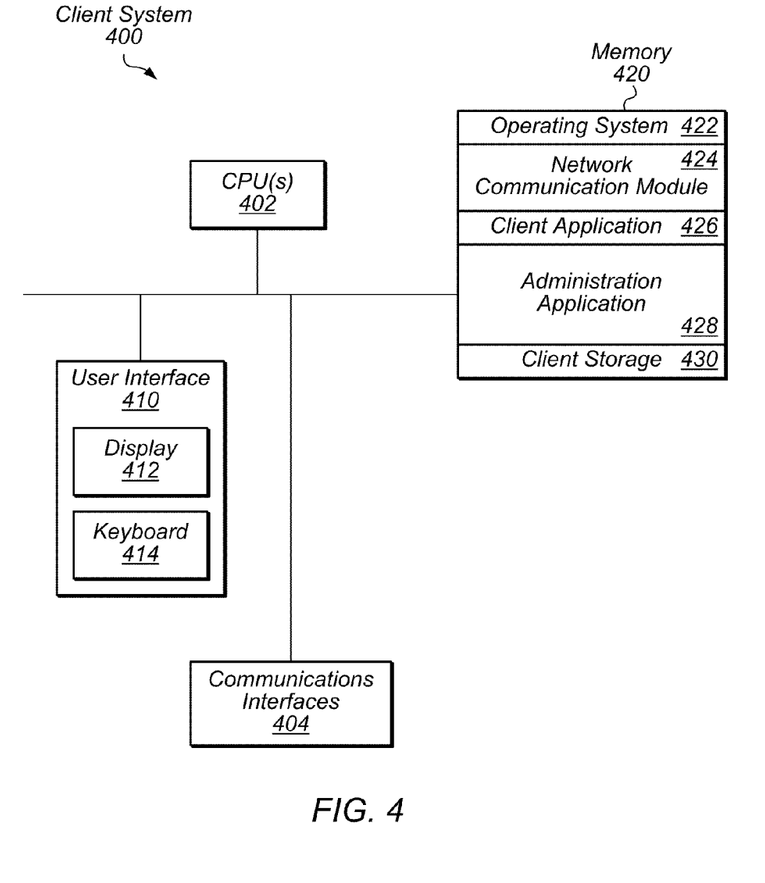
FIG. 4 is a block diagram illustrating one embodiment of a client computer system.

Referring to FIG. 4, one embodiment of client system 400 for implementing client system 142 and/or administrator system 144 is depicted. As shown, a client system 400 typically includes one or more processing units (CPUs) 402, one or more network or other communications interfaces 404, memory 420, and one or more communication buses 408 for interconnecting these components. The client system 102 may include a user interface 410, for instance a display 412 and a keyboard 414.

Memory 420 may include high speed random access memory and may also include non-volatile memory, such as one or more magnetic or optical storage disks. Memory 420 may include mass storage that is remotely located from CPUs 402. Memory 420 may store the following elements, or a subset or superset of such elements: an operating system 422 that includes procedures for handling various basic system services and for performing hardware dependent tasks; a network communication module (or instructions) 424 that is used for connecting the client system 102 to other computers via the one or more communications interfaces 404 (wired or wireless), such as the Internet, other wide area networks, local area networks, metropolitan area networks, and so on; client applications 426 for interacting with server 110; an administration application 428 for interacting with AMS 120; and client storage 430.

Figure 5:
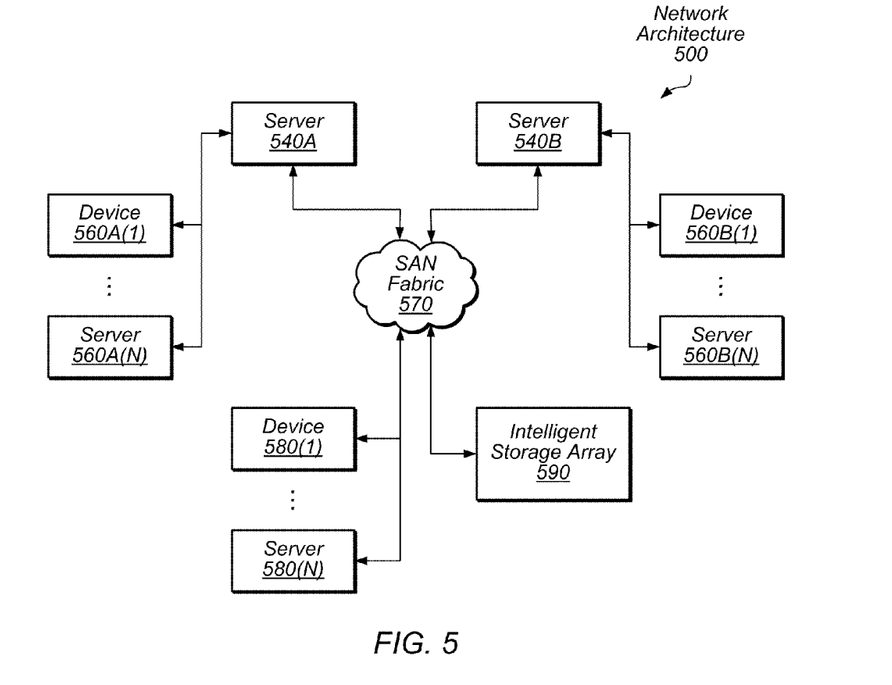
FIG. 5 is a block diagram illustrating one embodiment of a network architecture for implementing a storage system.

FIG. 5 is a block diagram depicting one embodiment of a network architecture 500 for implementing storage 130. In one embodiment, various blocks such as storage servers 540A and 540B can be implemented using computer systems similar to computer system 300 discussed above. Storage server 540A is depicted as having storage devices 560A(1)-

(N) directly attached, and storage server 540B is depicted with storage devices 560B(1)-(N) directly attached. Storage servers 540A and 540B are also connected to a SAN fabric 570, although connection to a storage area network is not required in all embodiments. In some embodiments, various other types of networks, such as Ethernet networks may be used in place of SAN fabric 570. In one embodiment, SAN fabric 570 supports access to storage devices 580(1)-(N) by storage servers 540A and 540B, and so by client systems 510, 520 and 530 via network 550. Intelligent storage array 590 is also shown as an example of a specific storage device accessible via SAN fabric 570. In various embodiments, various components or network architecture 500 may be implemented as part of a cloud-computing platform.

Figure 6:
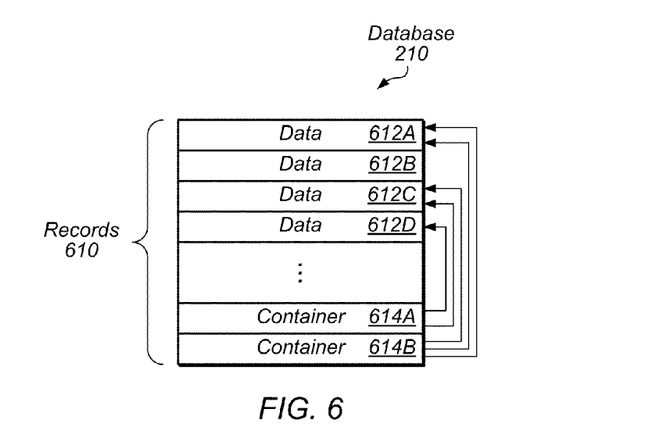
FIG. 6 is a block diagram illustrating one embodiment of a database.

Turning now to FIG. 6, one embodiment of database 210 is depicted. As shown, database 210 includes a plurality of records 610 for storing information related to data items 612A-D and containers 614A-B. In the illustrated embodiment, container 614A includes references to data items 612C and 612D. Container 614B includes references to data items 612A, 612B, and 612C. This structure allows allow multiple containers in database 210 to reference a single copy of a data item, thus saving space. For example, even though containers 614A and 614B include references to data item 612C, database 210 need only store a single record 610 for data item 612C.

In some embodiments, database 210 may utilize a structure in which none of records 610 for data items 612 include references to the records 610 for the containers 614 that include references to those data items. For example, in an embodiment in which database 210 has such a structure, data item 612A does not include a reference to container 614B. In some embodiments, using this structure may be beneficial for several reasons. First, it may allow a user to add a large number of documents to a folder, and only have to update one database record (the folder), rather than updating each document. Second, if a user changes a view selection formula, and the contents of the view changes, the user does not need to update any of the documents that now appear in (or no longer appear in) the view. Third, enforcing consistency of references is no longer necessary. In other words, utilizing a different type of structure might require a user to make sure that each time a container includes a reference to a document, that the document also includes a reference to that container. (Otherwise the references might be inconsistent.)

Figure 7:
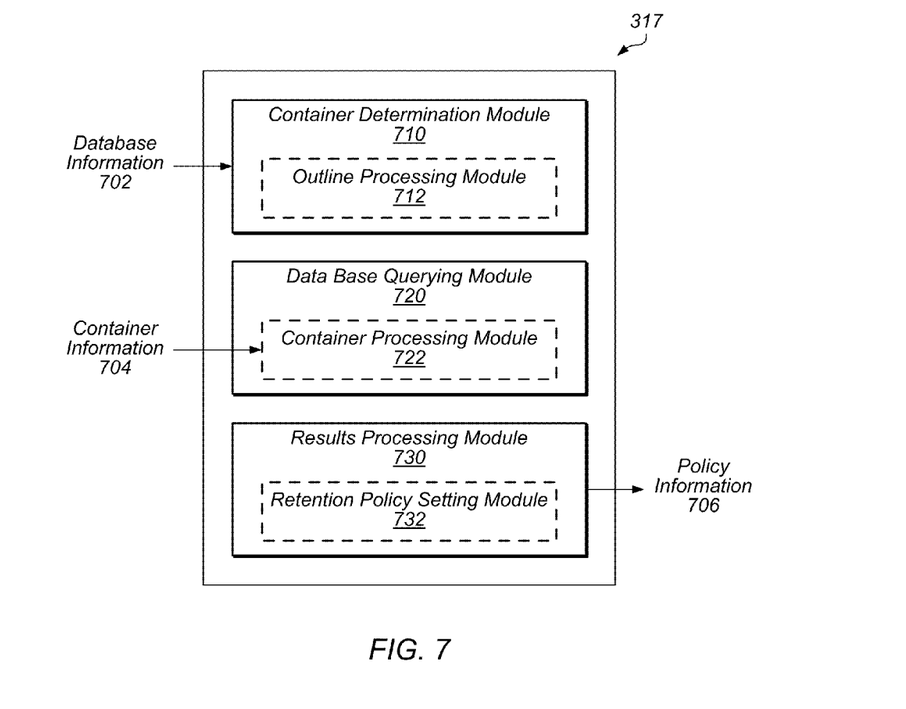
FIG. 7 is a block diagram illustrating one embodiment of various modules within a memory for determining database containers that include references to a given data item.

Turning now to FIG. 7, a block diagram of various modules within memory 317 for determining database containers that include references to a given data item is depicted. As shown, memory 317 includes a container determination module 710, database querying module 720, and a results processing module 730. In various embodiments, more or fewer modules may be used. In some embodiments, various modules may be implemented in hardware and/or software. For example, modules 710-730 may include program instructions that are executed by AMS 120 or may be implemented by logic within AMS 120.

In one embodiment, container determination module 710 determines a set of candidate containers that may include a specified data item (e.g., some data item specified by a user or by a storage program). For example, in one embodiment, module 710 processes database information 702 received from a server 110 to identify likely candidates. In one embodiment, information 702 may include an outline or a list of database containers. In some embodiments, module 710 includes an outline processing module 712 that retrieves an outline of a database from server 110 and determines candidate containers based on the outline.

In one embodiment, database querying module 720 queries the database for container information 704 associated with each of the candidate containers determined by module 710 and then determines whether each candidate container includes a reference to the specified data item. Information 704 may be information indicative of all of the entries referenced by a particular container, for example. In one embodiment, module 720 may analyze a single candidate container at a time. In other embodiments, module 720 may analyze multiple containers in parallel. In some embodiments, module 720 includes a container processing module 722 that generates a hash table from the contents of a container and then searches the generated hash table for a reference to a specified data item.

In one embodiment, results processing module 730 uses the results of querying performed by module 720 to determine containers in the candidate set of containers that include a reference to the specified data item. In some embodiments, module 730 includes a retention policy setting module 732 that sets storage retention policy information 706 for a copy of the specified data item, where the policy information 706 is based at least in part on retention information associated with the containers determined to include a reference to the data item (e.g., where a specified data item is associated with three containers in a database, policy information 706 is set to the longest retention period associated with the three containers).

Figure 8:
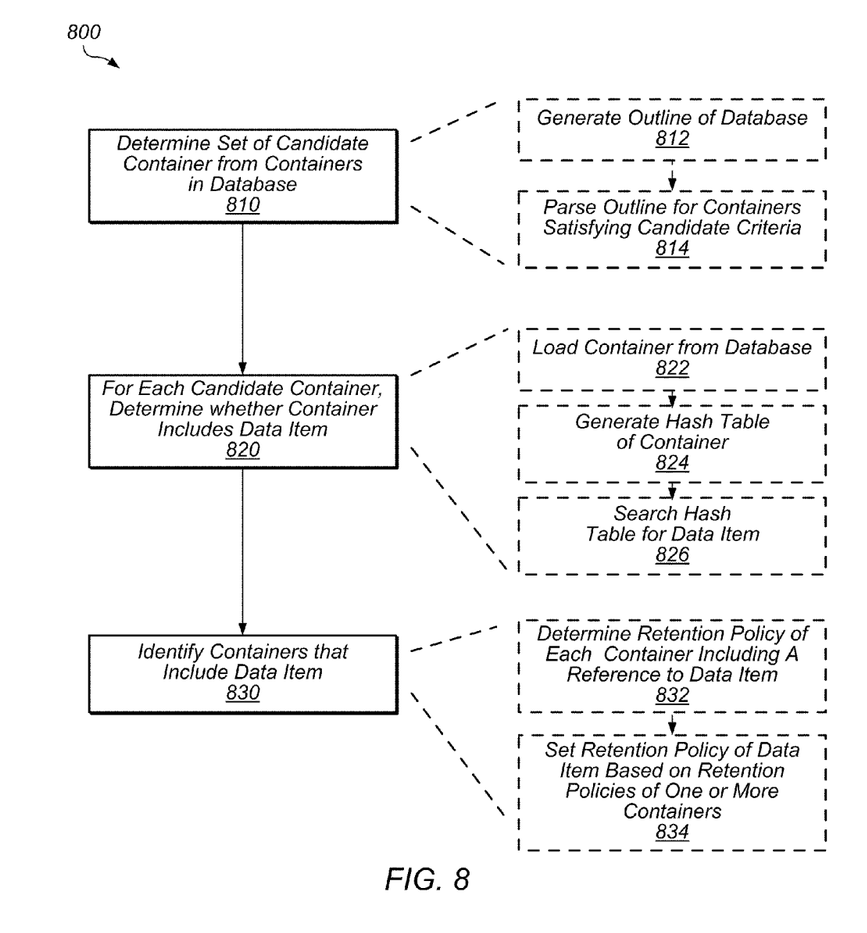
FIG. 8 is a flow diagram illustrating one embodiment of a method for determining database containers that include references to a given data item.

The operation of modules 710-730 is described in greater detail in conjunction with FIG. 8 presented below.

Turning now to FIG. 8, one embodiment of a method 800 for determining database containers that include references to a specified data item is depicted. In one embodiment, AMS 120 performs method 800 after receiving a request from a user (e.g., of client system 142 or administrator system 144) or a storage program for a list of containers that include a specified data item. In some embodiments, AMS 120 may perform multiple instantiations of method 800 in parallel for a plurality of specified data items. As shown, method 800 includes steps 810, 820, and 830 (shown on the left with solid lines). In some embodiments, steps 810-830 may be performed using one or more of the substeps 812, 814, 822, 824, 826, 832, and 834 (shown on the right with dotted lines).

In step 810, AMS 120 (e.g., using module 710) determines a set of candidate containers from the containers stored in database 210. In one embodiment, AMS 120 (e.g., using module 712) determines the set of candidate containers by retrieving an outline of database 210 and using the outline to determine the candidate set of containers. As noted above, an outline may list each of the containers stored in a database (e.g., database 210). In some embodiments, the outline may also indicate one or more respective properties of each container. Substeps 812 and 814, described below, are one embodiment of a method that identifies containers as candidate containers based on their respective properties listed in the outline. In other embodiments, AMS 120 may use other techniques for determining a set of candidate containers.

In step 820, AMS 120 (e.g., using module 720) determines whether each candidate container includes a reference to the specified data item. In one embodiment, AMS 120 queries database 210 (e.g., using API block 220) to determine whether each of the candidate containers includes a reference to the specified data item. In some embodiments, AMS 120 accesses a corresponding record in the database, for each of the candidate containers, to determine whether that container includes a reference to a specified data item in the database. In various embodiments, AMS 120 (e.g., using module 722) may determine whether a particular container includes a reference to the specified data item by searching a hash table generated from the contents of the container. Substeps 822, 824, and 826, described below, are one embodiment of a method that uses hash tables in this manner.

In step 830, AMS 120 (e.g., using module 730) identifies containers that include a specified data item. In one embodiment, AMS 120 provides a list of the identified containers to client system 142, administrator system 144, storage program, etc. In some embodiments, AMS 120 may perform one or more storage operations associated with the identified containers. For example, in one embodiment, AMS 120 (e.g., using module 732) may set storage policies for a copy of the specified data item based on storage policies of each container that includes a reference to the specified data item. Substeps 832 and 834, described below, are one embodiment of a method that sets storage retention policies based on containers that have been determined to include a reference to the a given data item.

Substeps 812 and 814 are usable, in one embodiment of method 800, to determine a set of candidate containers using an outline during step 810. In step 812, AMS 120 (e.g., using block 712) provides a request for an outline of database 210 to server 110. In one embodiment, this request may be directed to an API (e.g., within API block 220) that converts the outline to a corresponding text file. In step 814, AMS 120 (e.g., using block 712) parses the text file of the outline to identify containers that satisfy candidate criteria. For example, in some embodiments, the determined set of candidate containers may include containers that are accessible via a graphical user interface (e.g., of client system 142 or administrator system 144) associated with database 210. In some embodiments, the determined set of candidates may include either folders or views that have been created by a user (e.g., using a GUI). In various embodiments, AMS 120 may determine a preliminary set of containers that are accessible via a graphical user interface associated with database 210, and then determine the candidate set of containers by determining containers within the preliminary set that are folders or views. An example of one embodiment of an outline and corresponding text file are described below in conjunction with FIGS. 9A and 9B.

Substeps 822, 824, and 826 are usable, in one embodiment of method 800, to use hash tables to determine whether a given container includes a reference to a specified data item. In some embodiments, substeps 822, 824, 826 may be performed for each of the candidate containers determined in step 810. In step 822, AMS 120 (e.g., using module 722) loads a container from database 210 and its contents into memory. In one embodiment, AMS 120 retrieves the container from database 210 using an API in API 220. In step 824, AMS 120 generates a hash table of the container. In one embodiment, the generated hash table includes an entry corresponding to each of the data items referenced by the given container. For example, the entries within the hash table may include record IDs or hashes associated with each data item. In step 826, AMS 120 searches the hash table for the specified data item. In one embodiment, AMS 120 accesses the hash table using a note identifier of the data item as a key to determine whether an indication of the specified data item is present. In various embodiments, substeps 822, 824, and 826 may use any other types of data structure that represents a set of items and that allows testing of whether a given item exists within the set—e.g., search trees, lists, sorted lists, Bloom filters, etc.

Substeps 832 and 834 are usable, in one embodiment of method 800, to set storage retention policies based on containers that have been determined to include a reference to the specified data item. In step 832, AMS 120 determines the retention policies of each container that includes a reference to the specified data item. For example, a retention period for one folder might be 7 years, while a retention period for another folder might be 7 months. In step 834, AMS 120 sets a retention policy for a copy of the specified data item based on a combination of the retention policies of one or more of the containers. For example, in one embodiment, the retention policy for a data item is the longest of the determined retention periods of each container. Thus, applying the example above, a copy of a data item included in both containers would have a retention period of 7 years.

Figure 9A:
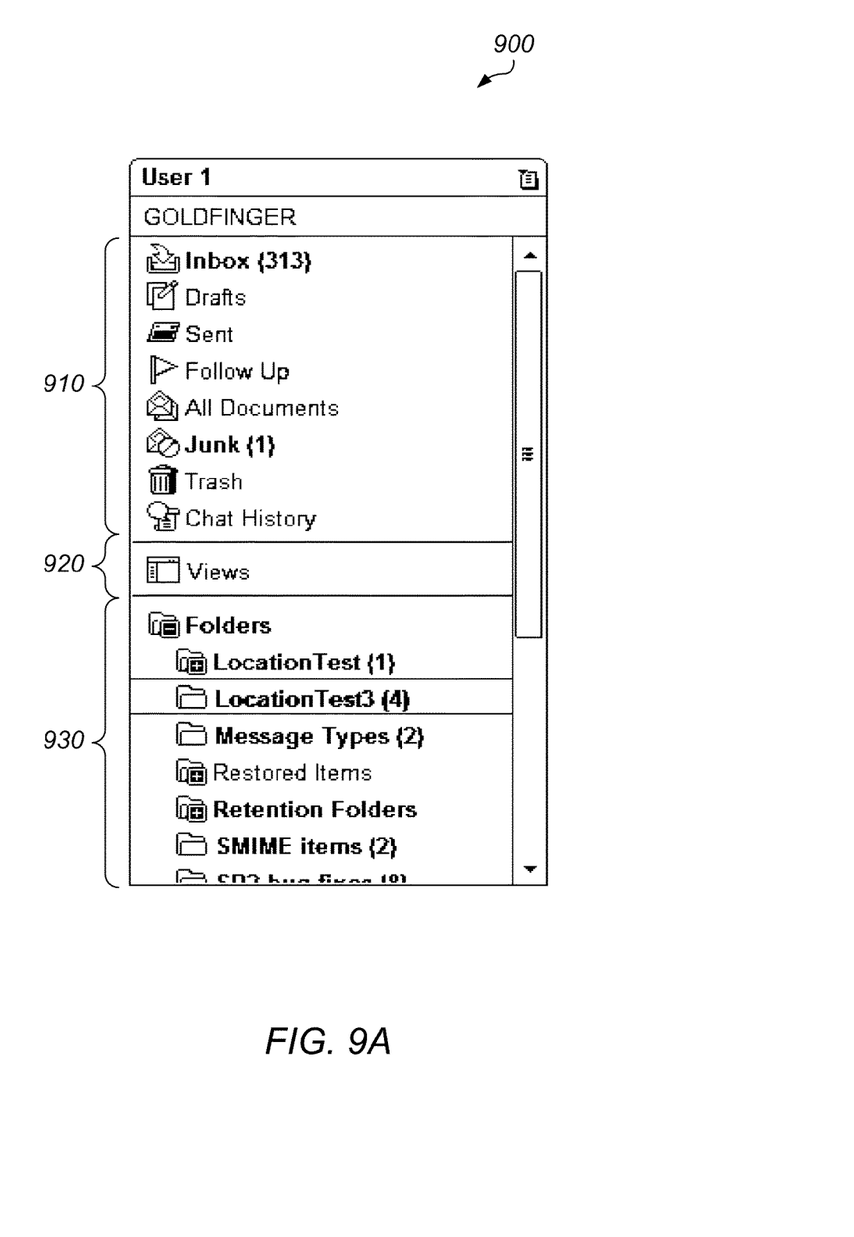
FIG. 9A is a screen shot of an email program that is based on a database.

Turning now to FIG. 9A, an example of one embodiment of an outline 900 is presented. In one embodiment, outline 900 is the NotesMailOutline of IBM's LOTUS NOTES email program. As shown, outline 900 includes upper, middle, and lower portions 910, 920, and 930, respectively. The upper portion 910 displays links to standard mailbox folders/views such as the "Inbox" container, "Sent" container, "Junk" mail container, etc. The middle portion 920 shows any user created views. The lower portion 930 shows a list of various user created folders such as "Location Test(1)," "Restored Items," etc.

As noted above, AMS 120, in step 812, may retrieve a text file that represents the outline shown in FIG. 9A. In one embodiment, AMS 120 retrieves this text file by locating the outline record using the NIFFindDesignNote( ) API function supported by LOTUS NOTES in which a call to NIFFindDesignNote( ) takes the name of the outline (NotesMailOutlineH), and returns the unique ID (noteID) of the outline record. AMS 120 may then convert the outline to XML, using the DXLExportNote( ) API function in which a call to DXLExportNote( ) takes the noteID of the record to export, and outputs an XML representation of the note.

Figure 9B:
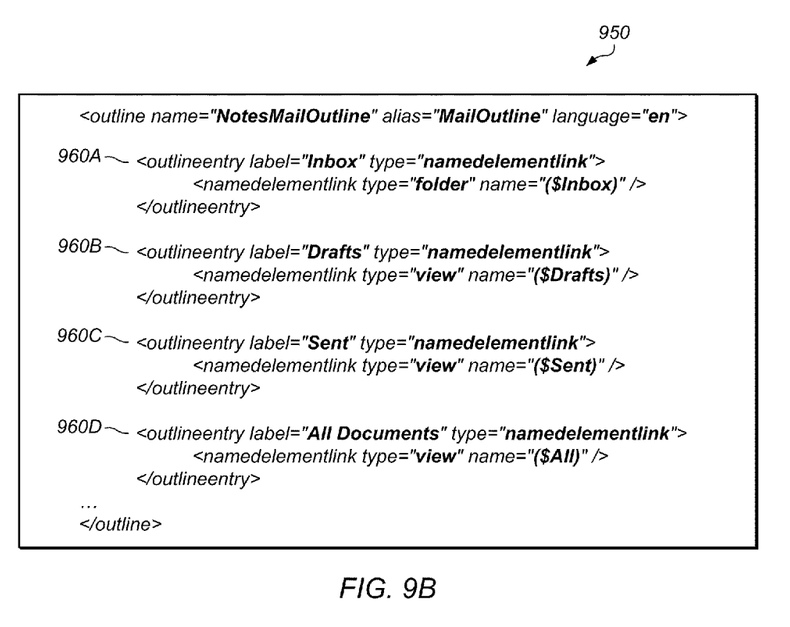
FIG. 9B illustrates a portion of a text file representative of an outline for the email program of FIG. 9A.

Turning now to FIG. 9B, an example of a text file 950 representative of an outline is shown. In the illustrated embodiment, text file 950 includes XML language. As shown, text file 950 includes a list of entries 960A-D, where each entry 960 corresponds to a visible container (i.e., accessible to a user via a GUI) stored in a database. For example, entry 960A corresponds to a user's inbox within a mail database. As shown, entry 960A includes a type field of "namedelementlink." In addition, entry 960A includes a named element link field that indicates that the container type is a "folder" and that the name of the container is "$Inbox." Entry 960A also indicates the container is not displayed in the "folders" section (i.e., portion 930) because the name "($Inbox)" is included within brackets. (In LOTUS NOTES, a particular folder or view may be designated as a system container (i.e., a container that is not created by a user) if its name is included with brackets—e.g., "($Inbox)". Generally, system folders are not included within the "folders" section.") Other entries 960 B-D may list similar properties.

As noted above, AMS 120, in step 814, may parse the text file to identify containers that satisfy candidate criteria. For example, in one embodiment, AMS 120 parses the text file looking for containers that are folders or views by using an XPath query to locate all <outlineentry> elements where type="namedelementlink" and where the child <namedelementlink> element has a type of "folder" or "view." In some embodiments, the XPath query may take the following form:

outline/outlineentry[@type='namedelementlink']/
 namedelementlink[@ty pe='view' or @type='folder']

In one embodiment, once the set of candidate containers has been determined in step 810, AMS 120 determines whether each candidate container includes a reference to the specified data item in step 820. In one embodiment, AMS 120 may read the contents of a folder by using the NSFFolderGetIDTable( ) API function in which a call to NSFFolderGet- IDTable( ) takes the noteID of a folder record, and then returns the noteIDs of all the notes that exist within the folder. AMS 120 may read the contents of a view by using the NIFOpenCollection( ) API function to open the view and the NIFReadEntries( ) API function to obtain of the noteIDs of all the notes that appear in the view. Once the contents of a folder or view have been obtained, AMS 120 can determine whether a container includes a reference to a given data item. In some embodiments, after AMS 120 has analyzed each of the candidate containers using this method, AMS 120 may then create a list of each of the containers that include a specified data item as in step 830 described above.

Various embodiments described above refer to a system 100 having an archival management system 120 that determines database containers that include references to a specified data item. Although AMS 120 has been described within the content of backup archival and other storage systems, embodiments of the present disclosure may also be applicable to other systems that need to determine containers that include references to a specified data item. For example, in one particular embodiment, an email client may implement an API that allows a user to specify an email and then identify any folders are views that include that email. Accordingly, embodiments of the present disclosure are not solely applicable to backup and archive devices but rather any devices that access information in containers.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for determining database containers that include references to a first data item, the method comprising:
   a computer system accessing information specifying respective properties of a plurality of containers in a database;
   based on the respective properties, the computer system determining a candidate set of containers that includes fewer than the plurality of containers, wherein the database includes a plurality of data items that includes the first data item, wherein each of the plurality of data items is stored in a respective one of a plurality of records of the database, wherein each of the containers in the candidate set of containers includes one or more references to data items in the plurality of data items, and wherein the database is structured such that a record within the database that includes a data item does not indicate which of the plurality of containers includes a reference to that data item;
   for each of the containers in the candidate set, the computer system querying the database to determine whether the container includes a reference to the first data item; and
   the computer system using results of the querying to determine any containers in the candidate set of containers that include a reference to the first data item.

2. The method of claim 1, further comprising:
   backing up the database to a backup storage system, wherein said backing up includes setting a storage retention policy for the first data item, wherein the storage retention policy is based at least in part on retention information associated with one or more containers in the candidate set of containers determined to include a reference to the first data item.

3. The method of claim 2, wherein each of the one or more containers in the candidate set of containers determined to include a reference to the first data item has an associated storage retention period, and wherein the storage retention policy for the first data item is set to be the longest of the associated storage retention periods.

4. The method of claim 1, wherein determining the candidate set of containers includes querying the database to return an outline for the database, causing the outline to be converted into a text file that specifies the types of containers within the database, and parsing the text file to determine containers specified by the outline that are folders or views.

5. The method of claim 1, wherein determining the candidate set of containers includes identifying a preliminary set of containers that are accessible via a graphical user interface associated with the database, and then selecting containers from the preliminary set as the candidate set of containers.

6. The method of claim 1, wherein the candidate set of containers includes a first container that is a folder, wherein the folder includes references to one or more data items associated with the folder by a user of the database.

7. The method of claim 1, wherein the candidate set of containers includes a first container that is a view, wherein the view includes references to one or more data items that satisfy a predetermined set of criteria specified by program instructions associated with the database.

8. The method of claim of 7, wherein the database corresponds to an email program, and wherein the first container includes references to email messages sent by the email program.

9. The method of claim 1, wherein said querying includes, for a given container in the candidate set of containers, storing each data item referenced by the given container in a hash table, and then accessing the hash table to determine whether the given container includes a reference to the first data item.

10. An article of manufacture comprising a computer-readable medium having stored thereon program instructions that, if executed by a computer system, cause the computer system to perform a method comprising:
   retrieving a first list of containers within a database, wherein the first list specifies respective properties of the containers, wherein each of a plurality of the containers includes a reference to one or more data items within the database;
   using the first list to determine a candidate set of containers that does not include all the containers in the first list;
   for each container in the candidate set of containers, accessing a corresponding record in the database to determine whether that container includes a reference to a specified first data item in the database; and
   using said accessing to create a second list of containers that include a reference to the specified first data item.

11. The article of manufacture of claim 10, the method further comprising backing up the database, wherein said backing up includes assigning a storage retention policy to a backed up copy of first data item, wherein the storage retention policy for the first data item is based, at least in part, on retention policy information corresponding to one or more containers specified in the second list.

12. The article of manufacture of claim 10, wherein containers in the candidate set of containers are either folders or views.

13. The article of manufacture of claim 10, wherein the data items within the database include email messages for an email program, and wherein the database does not include an application programming interface (API) that permits a user to specify a particular data item within the database and obtain a list of any containers in the database that include a reference to the particular data item.

14. The article of manufacture of claim 10, wherein containers in the candidate set of containers are created by a user via a graphical user interface associated with the database.

15. The article of manufacture of claim 10, the method further comprising storing a copy of the first data item, wherein said storing includes assigning a storage policy to the copy of first data item, wherein the storage policy is based, at least in part, on storage policy information corresponding to one or more containers specified in the second list.

16. A computer system, comprising:
one or more processors;
memory having stored therein program instructions executable by the computer system to:
  determine a candidate set of containers within a database, wherein each container in the candidate set of containers includes a reference to one or more data items in the database, and wherein each container within the candidate set of containers is user-accessible via a graphical user interface for the database;
  identify at least two of the candidate set of containers that include a reference to a specified first data item within the database;
  examine respective retention policies for the at least two containers to determine a longest retention policy of the respective retention policies; and
  backup the database to a backup storage system, including setting a retention policy for the first data item based on the determined longest retention policy.

17. The computer system of claim 16, wherein determining the candidate set of containers includes parsing a text file returned by the database to determine containers within the database that are folders or views.

18. The computer system of claim 16, wherein determining the candidate set of containers includes identifying containers within the database that are user created, and selecting the candidate set of containers from the identified containers.

19. The computer system of claim 16, wherein the program instructions further executable to store, for a given container in the candidate set of containers, an indication of each of the data items referenced by the given container in a hash table and then access the hash table to determine whether the given container includes a reference to the first data item.

20. The computer system of claim 16, wherein the first data item is an email message, and wherein the database is structured such that a record in the database that includes the first data item does not specify any containers within the database that include a reference to the first data item.

* * * * *